(12) United States Patent
Imbert et al.

(10) Patent No.: US 9,221,542 B2
(45) Date of Patent: Dec. 29, 2015

(54) DEVICE FOR FEEDING ELECTRICITY TO EQUIPMENT, THE DEVICE BEING INCORPORATED IN THE FLOOR OF AN AIRCRAFT CABIN

(71) Applicant: AIRBUS HELICOPTERS, Marignane (FR)

(72) Inventors: Nicolas Imbert, Marseille (FR); Charles Chuc, Marseille (FR)

(73) Assignee: Airbus Helicopters, Marignane (FR)

( * ) Notice: Subject to any disclaimer, the term of this patent is extended or adjusted under 35 U.S.C. 154(b) by 705 days.

(21) Appl. No.: 13/663,605

(22) Filed: Oct. 30, 2012

(65) Prior Publication Data

US 2013/0106177 A1 May 2, 2013

(30) Foreign Application Priority Data

Oct. 31, 2011 (FR) ...................................... 11 03310

(51) Int. Cl.
*B64D 11/06* (2006.01)

(52) U.S. Cl.
CPC ........ *B64D 11/0696* (2013.01); *B64D 11/0624* (2014.12)

(58) Field of Classification Search
CPC .................. B64D 11/0696; B64D 11/0624
USPC .......................................................... 307/9.1
See application file for complete search history.

(56) References Cited

U.S. PATENT DOCUMENTS

| | | | | | |
|---|---|---|---|---|---|
| 3,956,573 | A | * | 5/1976 | Myers | H02G 3/185 174/488 |
| 4,297,524 | A | * | 10/1981 | Fork | H02G 3/185 174/488 |
| 4,763,360 | A | | 8/1988 | Daniels | |
| 5,106,121 | A | * | 4/1992 | Boone | B60R 22/023 280/807 |
| 6,425,773 | B2 | | 7/2002 | Mosebach | |
| 7,459,632 | B2 | * | 12/2008 | Bowman | E04F 19/083 174/482 |
| 2005/0211835 | A1 | | 9/2005 | Henley | |
| 2005/0258676 | A1 | | 11/2005 | Mitchell | |
| 2006/0038070 | A1 | | 2/2006 | Henley | |
| 2006/0097109 | A1 | | 5/2006 | Laib | |
| 2007/0164156 | A1 | | 7/2007 | Henley | |
| 2011/0079682 | A1 | * | 4/2011 | Raybell | B64D 11/06 244/122 R |

FOREIGN PATENT DOCUMENTS

| | | | | |
|---|---|---|---|---|
| CA | 2478204 | * | 8/2004 | ............. B64D 11/00 |
| EP | 1137109 A2 | | 9/2001 | |

OTHER PUBLICATIONS

Search Report and Written Opinion; Application No. FR 1103310; dated Aug. 9, 2012.

* cited by examiner

*Primary Examiner* — Rexford Barnie
*Assistant Examiner* — Terrence Willoughby
(74) *Attorney, Agent, or Firm* — Brooks Kushman P.C.

(57) ABSTRACT

A device (50) for feeding electricity to equipment (3) of a vehicle (1), the device including a harness (5), a socket (6) electrically connected to said harness (5), and a plug (9) electrically connected to said equipment (3) and co-operating with said socket (6) to provide the electrical connection between said harness (5) and said equipment (3). The device (50) provides for said harness (5) to run in the thickness of a floor (2) of the vehicle (1), said socket (6) being embedded in the thickness of said floor (2) so that the top surface of said floor (2) does not present any projecting portion. The device (50) includes a movable protection cap (7) for opening and closing said socket (6), together with opening means (40) driven by mounting said equipment (3) on said floor (2), thereby causing said movable protection cap (7) to open.

15 Claims, 4 Drawing Sheets

DEVICE FOR FEEDING ELECTRICITY TO EQUIPMENT, THE DEVICE BEING INCORPORATED IN THE FLOOR OF AN AIRCRAFT CABIN

CROSS REFERENCE TO RELATED APPLICATIONS

This application claims priority to French patent application No. FR 11 03310 filed on Oct. 31, 2011, the disclosure of which is incorporated in its entirety by reference herein.

BACKGROUND OF THE INVENTION (1) Field of the Invention

The present invention relates to the field of electrical equipment for vehicles, such as aircraft. The present invention relates to a device for feeding electricity to equipment, such as seats fastened to the vehicle, and the invention also relates to an aircraft including such a device.

(2) Description of Related Art

It is becoming more and more frequent for various types of electrical function to be provided on vehicle seats, such as a safety function involving an airbag, for example, or a comfort function, e.g. performed by heater means, or an information function, e.g. to detect the presence of a passenger.

In the particular circumstance of aircraft, cabin reconfiguration can be frequent, thus requiring one or more pieces of equipment to be shifted, turned, added, or removed, together with the various elements with which the pieces of equipment may be connected or associated.

By way of example, airbag-fitted seats are presently in use in particular in rotary wing aircraft, however they are generally electrically independent, having a battery for electrically powering the airbag and an electronic unit for causing the airbag to be deployed. Under such circumstances, the extra weight added to the seat may be considerable, thereby making the seat difficult to move.

Furthermore, because of this electrical and electronic independence, there is a considerable risk of an airbag being deployed in untimely manner whenever the seat is being handled, and as a result additional precautions need to be taken.

Finally, the electrical and electronic functions incorporated in a seat, such as an airbag, are sometimes critical, i.e. they require electronic systems that are complex and sensitive to any external disturbance, and they often present a lifetime that is short. The associated maintenance costs can thus be considerable.

Given the above-mentioned risks and constraints, it is common practice at present to avoid incorporating such electrical functions in aircraft seats.

In contrast, it is common practice to use numerous electrical and electronic functions in motor vehicles, in particular in the front seats of such vehicles. Under such circumstances, the seats are placed in a single and permanent position so they are generally fed with electricity by a bundle of electric wires extending from the floor and fitted with a connector. The bundle is manually connected to a complementary connector of the seat in the factory during assembly of the vehicle, and no particular constraint is therefore associated with incorporating the bundle and the connector in the floor of the vehicle, other than accommodating the various potential movements of the seat. Thus, during the lifetime of the vehicle, those seats are never removed or placed somewhere else (except under exceptional circumstances of repair in the garage), so the seat zones are not configurable.

Certain motor vehicles, of the multipurpose vehicle (MPV) type, have a rear zone in which the seats are easily removed, shifted, and positioned in a variety of configurations. However, under such circumstances, those seats do not have any information or electrical power functions, since their modularity is not compatible with the presence of an electrical wiring bundle on the floor.

For electrical connections that are present in vehicles of any type, it is also known in conventional manner to make use of connections of the male/female contact type, for mutual co-operation. Although the operation of such connections is reliable in an environment that is clean, they are nevertheless very sensitive to environmental pollution (dust, mud, ...) that can disturb electrical connections, and give rise to short circuits and to mechanical damage, depending on the nature of the items that infiltrate between the contacts.

Documents US 2007/0164156 and US 2005/0211835 present an electrical bus system that runs along the total length of an airplane cabin in order to feed electricity to the passenger seats installed in the cabin. The bus has one or more conductor lines over its entire length suitable for connection to data and electrical power sources. The bus is in the form of a rail positioned on top of the floor close to the seat-fastening rail and it is open on one of its sides along its entire length. A connector connected electrically to each seat or to each row of seats can then be connected to the bus through that opening at any point along the cabin of the airplane in order to establish electrical connection between the seats and the various data and power sources. The conductor lines inside the bus are protected from the external environment, in particular by lips of flexible material covering the open side of the bus, thereby providing sealing while also allowing the connectors that are connected to seats to be inserted. Once all of the seats have been put into position and connected to the bus, zones of the bus remain accessible, in particular close to the stands of the seats. The stands, also known as legs, constitute the bottom portions of the equipment, and serve to fasten the equipment to the floor. The covering of the seat fastener rails then needs to be reorganized so as to be adapted to the positions of the seats and cover the zones close to the seat stands and to the connectors connected to the bus so as to prevent access to the feed rail.

Document US 2006/0038070 is also known and describes a cabling system and method for supplying electrical power and/or communications data in a vehicle cabin, and more particularly to seats installed in the cabin. A plurality of lower connectors are fastened in panels of the cabin floor and are connected to an electrical wiring bundle of the vehicle. Top connectors, e.g. connected to the electronics units of seats, can then be connected to the bottom connectors so as to connect the seats electrically to the electrical wiring bundle of the vehicle.

Furthermore, document US 2006/0097109 describes a cover device for covering the seat fastening rails between the rows of seats installed in the cabin of a vehicle, e.g. an airplane. That cover device is adjustable so as to be adapted to the space available between the rows of seats. The device also has an electrical wiring bundle and connectors for electrically connecting each seat to the vehicle.

Document U.S. Pat. No. 4,763,360 is known and describes a system for making electrical connections to vehicle seats by using the fastening rails of those seats. A fastening rail includes one or two conductor strips fastened along the rail and separated from the rail by insulation. When a seat is fastened to the rail, a device incorporated in the seat enables an electrical connection to be established between the seat and those conductor strips, thus enabling data and/or electrical power to be transmitted.

Finally, document US 2005/0258676 describes a system and a method for distributing electrical data and/or power signals to equipment in a vehicle cabin, and more particularly to seats installed in the cabin. An electrical bus runs under the floor of the cabin and a seat may be connected to the electrical bus at any point within the vehicle cabin, by means of a connector.

It should be observed that the technological background contains document EP 1 137 109 that describes an electricity outlet for an airplane fitted with a safety device that prevents any connection without the presence of a plate that has previously been put into position on the female outlet in order to unlock the safety system and insert the male plug.

It can be understood that the increase in various types of electrical function incorporated in vehicle equipment, and in particular in seats, is not necessarily compatible with the modularity that is nowadays required for the cabins of such vehicles.

Reconfiguring an aircraft cabin generally needs to comply with time constraints so as to minimize the length of time the vehicle is unavailable. When reconfiguring a cabin fitted with equipment having electrical functions, it is therefore difficult to envisage needing to modify the installation of all of the electrical wiring bundles for feeding the equipment.

Furthermore, the top surface of the cabin floor, i.e. the surface facing the equipment, must avoid hindering either the loading of loads or the movement of people. It is also appropriate to avoid having electrical elements that might be damaged by the passage of people or loads.

Finally, the sometimes-aggressive external environment in which such vehicles may operate constitutes an additional constraint that needs to be taken into account, in particular in the presence of electrical functions.

BRIEF SUMMARY OF THE INVENTION

An object of the present invention is thus to propose a device for feeding electricity to equipment that enables the above-mentioned limitations to be obviated, while allowing equipment including electrical functions to be reconfigured quickly in a vehicle cabin, while also remaining compatible with various external environments with which the vehicle may be confronted.

The invention provides a device for feeding electricity to equipment in a vehicle, such as an aircraft seat, the device comprising an electrical wiring bundle, referred to for convenience as a "harness", having at least one electrical conductor, and a connector, referred to as a "socket" for convenience, having at least one electrical contact.

Each conductor of the harness may be electrically connected firstly to contacts in the socket and secondly to electrical power and information sources of the vehicle, corresponding to various functions incorporated in the equipment, possibly via an electronic computer centralizing all of these sources.

The vehicle equipment includes a connector, referred to as a "plug" for convenience, including at least one electrical pin, the plug being connected to an electrical wiring bundle secured to the vehicle equipment. Each pin of the plug may be electrically connected to at least one conductor of the wiring bundle of the equipment, each conductor of the bundle being suitable itself for connection to various functions incorporated in the equipment, possibly via an electronic computer centralizing all of these functions.

The socket co-operates with the plug so that each contact in the socket establishes an electrical connection with a pin of the plug, thereby electrically connecting the information and power sources of the vehicle with the various electrical functions of the equipment.

The device is remarkable in that the harness is suitable for running under the top surface of a floor of the vehicle, facing the equipment, the socket being suitable for being embedded in the thickness of the floor of the vehicle. As a result, the top surface of the floor does not present any projecting portion.

Each socket is positioned in the floor of the aircraft at locations corresponding to potential positions for pieces of equipment in all of the possible configurations. The vehicle needs to comply with various regulations for each configuration of its cabin, and in particular for each seat position. Even though these seat positions may be numerous, they are therefore not unlimited, but on the contrary are strictly defined and known.

These positions thus correspond to the various certifications that the vehicle has received. It is also not unusual, in certain zones of vehicles, to find rails that present a length of about 20 centimeters (cm), which rails are thus strictly limited to receiving only one seat. It is then possible to position an electrical interface on the floor of the vehicle cabin for each potential seat position in all of the certified configurations.

As a result, the device makes provision for the harness to run within the floor and for the socket to be embedded in the floor. This means that the top surface of the vehicle floor, facing the equipment, does not present any projecting portion, in particular in zones where no equipment is installed. The device thus eliminates the risks of these electrical interfaces being damaged by an external element or of having an interface fitted on the floor and projecting from the top surface of the floor, where it could constitute an obstacle.

Furthermore, the device of the invention includes a movable protection cap for opening and closing the socket in order to make the socket accessible for connecting an equipment plug, and in order to close the socket when no equipment is to be connected thereto. The device also has opening means serving during installation of the equipment on the floor, to cause the movable protection cap to open.

The socket and in particular its electrical contacts, is thus isolated from the external environment and is protected from intruding items, which might otherwise lead to damage or to a short circuit. The socket is also protected from impacts that might be caused by people moving on the floor or by loads being transported.

Finally, the means for opening the movable protection cap cause the protection cap to open after an equipment stand has been inserted into the rail of the vehicle floor, when the stand comes up against abutments corresponding to its position. The socket is thus made available for connecting the plug that is electrically connected to the equipment.

It can thus be understood that the device of the invention enables the cabin of a vehicle to be reconfigured quickly, in terms of the various possible positions and orientations for the pieces of equipment, while remaining compatible with the various electrical functions of the equipment, and without there being any need to modify the wiring present in the cabin, and while also guaranteeing that the floor outside the zones carrying equipment does not have any projecting portion that might impede any movement or loading.

The device may also include one or more additional characteristics.

For example, the movable protection cap of the socket, when in its closed position, may be flush with the top surface of the vehicle floor, thus making it possible to have a floor without any roughnesses, i.e. without any projecting zone or depression zone.

In an alternative of the invention, the movable protection cap is secured to the socket and a gasket of flexible material is placed between the movable protection cap and the socket. The gasket, which may be made of silicone for example, may be incorporated in the socket with sealing being provided by the movable protection cap coming into contact with the gasket when it is closed on the socket, thereby isolating the socket and the electrical contacts it contains from external elements.

The external environment may be aggressive (sand, sea water, mud, . . . ), in particular for electrical components, as can be the various loads transported or their contents. The socket and the electrical contacts it contains are positioned in the floor and are consequently highly exposed to the external environment.

As a result, there is a significant risk of the socket or the electrical contacts it contains being damaged if the socket is not protected sufficiently to withstand those elements, i.e. if the socket does not have a satisfactory sealing system.

In addition, since the movable protection cap is secured to the socket, sealing is totally independent of any deformation of the floor, of the various elements of the floor, and of dispersions in the positioning of the sockets, in particular relative to the floor.

In a variant of the invention, the gasket may be secured to the movable protection cap, with another gasket then being incorporated in the plug so as to provide sealing for the device when the plug is connected to the socket.

In a preferred embodiment of the invention, the opening means comprise two fingers connected to the movable protection cap in order to allow the movable protection cap to be opened. By way of example, the two fingers are placed on either side of the socket and cause the movable protection cap to be opened while equipment is being installed in the rail of the floor.

This redundancy makes it possible to avoid the movable protection cap being opened accidentally or in untimely manner during human action or while inserting items into the rail, thus avoiding the risks associated with such opening. In the absence of such redundancy, i.e. when only a single finger is used, it remains possible for the movable protection cap to be opened accidentally as a result of an external element pressing against the single finger. Access to the socket and to the electrical contacts it contains would then be made available, giving rise to significant risks of the contacts being damaged by external elements, and also of people being electrocuted.

By using two fingers, it is necessary to have a specific interface for opening the movable protection cap by acting simultaneously on both fingers. The specific interface may be a tool provided for maintenance operations, for example, or it may be the stand of the equipment acting while the equipment is being installed in the rail.

For example, at least one finger of the opening means may include an inclined slope at a first end of the finger that projects into the rail when the finger is in a first position. While equipment is being installed, the stand of the equipment moves in translation in the rail towards a positioning abutment, and by co-operating with the inclined slope, it causes the finger to move in translation. Resilient means placed at a second end of the finger ensure that the finger returns into the first position when the equipment is removed.

Thus, a finger forming part of the means for opening the movable protection cap is automatically moved in translation while the equipment is being installed, without direct manual intervention being required on the device. The opening means then open only the movable protection cap that corresponds to the piece of equipment that is being installed. As a result, time is saved during cabin reconfigurations and there is no risk of movable protection caps that do not correspond to the selected configuration becoming unlocked.

In a variant, at least one finger of the opening means has an inclined slope located at a first end of the finger and suitable, when in a first position, for co-operating with a locking system of the equipment in such a manner that it is the locking of the locking system to the rail that causes the finger to move in translation. Resilient means placed at a second end of the finger ensure that the finger can return to the first position.

In this variant, the opening means are activated automatically by the finger moving in translation when equipment is locked to the rail in the floor as contrasted to when the equipment is put into place, and it is only at the time of locking that the movable protection cap opens. This obtains the same advantages in terms of saving time.

In another embodiment of the invention, at least one finger of the opening means includes at least one means for locking the movable protection cap. By way of example, the locking means may comprise one or two hooks secured to the finger and two pegs secured to the movable protection cap and co-operating with the hooks of the finger. By way of example, the movement in translation of the finger that is obtained when installing the equipment serves to disengage the pegs from the hooks, thereby unlocking the movable protection cap. At least one resilient element may then cause the movable protection cap to turn about a hinge pin, thereby opening the socket, which hinge pin may be secured to the socket, for example.

In this embodiment, the movable protection cap, once unlocked, automatically opens the socket under drive from the resilient, thereby giving access to the socket for connecting the plug.

After the equipment has been removed, the locking means of the movable protection cap return to the locked position under drive from resilient means placed at the end of the fingers. Manual action enables the socket to be closed by means of the movable protection cap, which cap becomes locked automatically by the locking means.

In another alternative, the movable protection cap includes at least one cam co-operating with at least one finger so that movement in translation of the finger causes the movable protection cap to turn about a hinge pin. As a result, the movement in translation of the finger while the equipment is being installed on the floor causes the movable protection cap to turn so as to open the socket. When the equipment is removed, the finger is released and driven in translation under the effect of resilient means, with movement in translation of the finger causing the movable protection cap to turn in the opposite direction so as to close the socket.

This alternative presents the additional advantage of not only automatically opening the socket while installing the equipment, but also of automatically closing the socket while removing the equipment. In addition to the time saving obtained when reconfiguring the cabin, automatically closing the socket eliminates any risk of forgetting to close the socket, and thus eliminates the above-mentioned risks that occur in the event of the socket being opened accidentally, such as damaging the contacts or electrocuting people. By way of example, the risk of the movable protection cap remaining in its raised position and being broken by moving loads or people, is likewise eliminated by such automatic closure.

The invention also provides for the plug that is connected to the equipment to include at least one pin of the spring contact type and for the socket that is embedded in the floor to include at least one electrical pad contact, the contacts co-operating with each other so as to provide the electrical connection between the harness and the equipment.

Because of the small volume of electrical pad contacts, the use of such contacts in the socket serves to reduce significantly the size of the socket, thereby enabling it to be embedded in floors of small thickness, of the kind that can be found in particular in rotary wing aircraft.

Furthermore, various electrical or electronic functions can nowadays be incorporated in equipment and in particular in seats, as listed below in non-exhaustive manner:

safety functions: power and signal for triggering an airbag, for example;

comfort functions: heater means, cooling an active suit of a crew member, for example; and information functions: detecting the presence of a passenger, a headset incorporated in a seat, or a screen, for example.

The multiplication of such functions increases the number of contacts that need to be used for electrically connecting a seat to the vehicle, and also increases the variety of their characteristics in terms of the electric currents they are called on to convey, it being possible for example to have power supply lines for powering airbags and seat heaters, and signal lines, e.g. for connection to communications means (telephones, laptops, . . . ), or for exchanging data (triggering airbags, detecting whether a passenger is present on a seat, . . . ). Still because of their small size, electrical pad contacts enable this increase in the number of functions to be accommodated while remaining in a small volume.

Furthermore, contacts of this type (spring contacts and electrical pad contacts) are a technology that is well known and they are capable of passing both power supply currents and signals.

Finally, this type of connection makes it possible to accommodate mechanical positioning offsets between the movable portion (plug connected to the equipment and containing the spring contacts) and the stationary portion (socket secured to the floor and containing the electrical pad contacts), as occasioned by dispersions in the positioning of rails or in the installation of pieces of equipment, and also by deformation of the floor.

The device optionally includes means for protecting the plug when the equipment is fastened to the floor and the socket is electrically connected to the plug of the equipment. This protection serves to protect the plug of the equipment from impacts that might be caused by external elements, in particular the feet of passengers in the vehicle.

The present invention also provides an aircraft fitted with such a device, the harness running under the top surface of the floor and the socket being embedded in the thickness of the floor so that the top surface of the floor facing the equipment does not present any projecting portion, in particular in zones on which no equipment is installed. A movable protection cap serves to open and close the socket, in particular by using opening means that are driven during installation of the equipment in the rail of the floor.

The invention also provides an aircraft fitted with such a device, the plug of the equipment being connected to the stand of the equipment in such a manner that, once the equipment has been locked in the rail, the plug moves along a predetermined path under drive from a lever so as to connect with the socket.

In this embodiment, the equipment of the aircraft is initially assembled and locked to the rail of the floor, thereby opening the socket. Thereafter, the operator in charge of putting equipment into place in the cabin can connect the equipment electrically to the aircraft by using a lever. This lever, connected to the plug, drives movement of the plug relative to the stand of the equipment along the predetermined path so as to ensure electrical connection between the socket and the plug.

The predetermined path of the plug is defined by the position of the stand relative to the floor, by the position of the socket in the floor, and by the position of the plug relative to the stand, so as to guarantee electrical connection between the socket and the plug.

As described above, the advantages of this embodiment lie in the socket being opened automatically during installation or locking of the equipment. In addition, the connection of the plug to the socket as obtained by means of a lever and movement along the predetermined path is thus made more reliable. As a result the equipment can be put into place and connected quickly and reliably.

In the above description, a seat is sometimes used as an example of a piece of equipment and the same example is also used in the description below, however the device of the invention may naturally be extended to any kind of equipment that is fastened in the cabin and that requires an electrical feed for power and for signals.

BRIEF DESCRIPTION OF THE SEVERAL VIEWS OF THE DRAWINGS

The invention and its advantages appear in greater detail from the following description of embodiments given purely by way of illustration and with reference to the accompanying figures, in which.

Elements that are shown in more than one of the figures are given the same references in each of them.

DETAILED DESCRIPTION OF THE INVENTION

Figure 1:
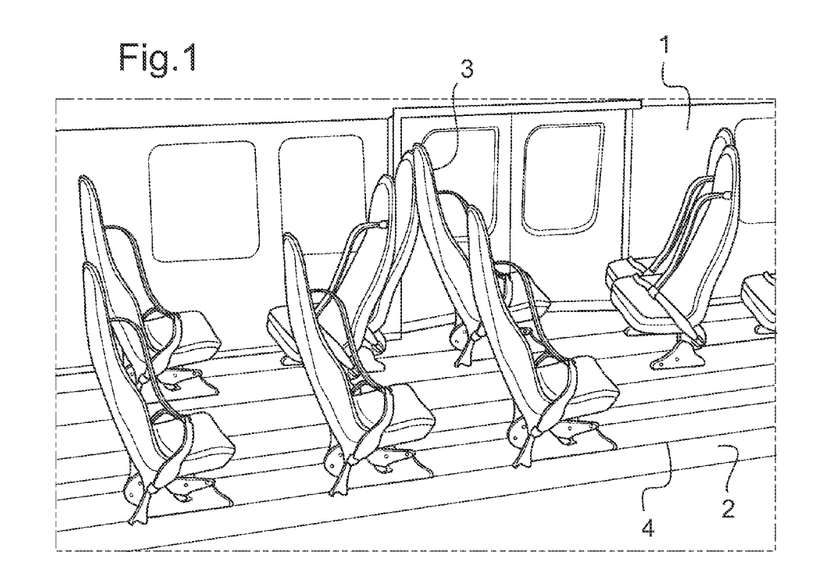
FIG. 1 is a view of the interior of the cabin of a vehicle fitted with seats.

FIG. 1 shows a vehicle 1 having at least one piece of equipment 3 such as a seat or a table fastened inside the vehicle to a floor 2 by means of a fastening rail 4 embedded in the floor. The various electrical functions that may be incorporated in the seat 3 are not shown in the figures.

Figure 2:
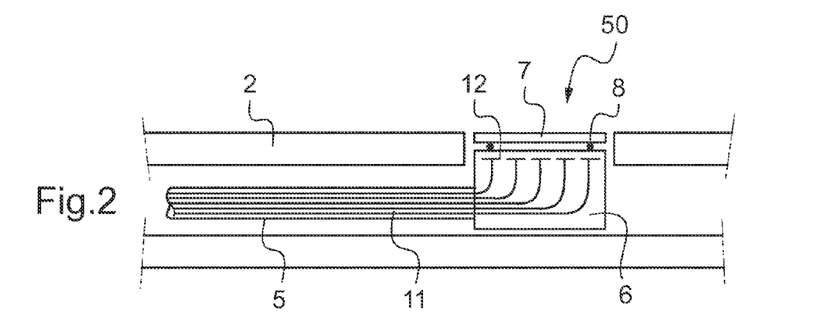
FIG. 2 is a section view of the installation of the socket and of the harness in the floor.

FIG. 2 shows the electrical feed device 50 comprising an electrical harness 5 and a socket 6. The harness 5 has at least one conductor 11 and extends inside the floor 2, each conductor 11 being electrically connected firstly to one or more electrical signal or power sources (not shown in the figures) of the vehicle 1, and secondly to one or more contacts 12 located in the socket 6.

The socket 6 is embedded in the floor 2 and it is protected from the outside environment by a movable protection cap 7. This protection serves to avoid foreign elements intruding into the socket 6 or onto the contacts 12, which could lead to mechanical damage or to short circuits. This protection also avoids any risk of electrocuting people in the vehicle, whether they are seated or moving about. In its closed position, the movable protection cap 7 provides a top surface of the floor 2 facing the equipment 3, without any projection and it may be flush with the top surface of the floor 2, thus making it possible to have a floor 2 that is smooth, i.e. without any projecting or depressed zone.

Figure 3:
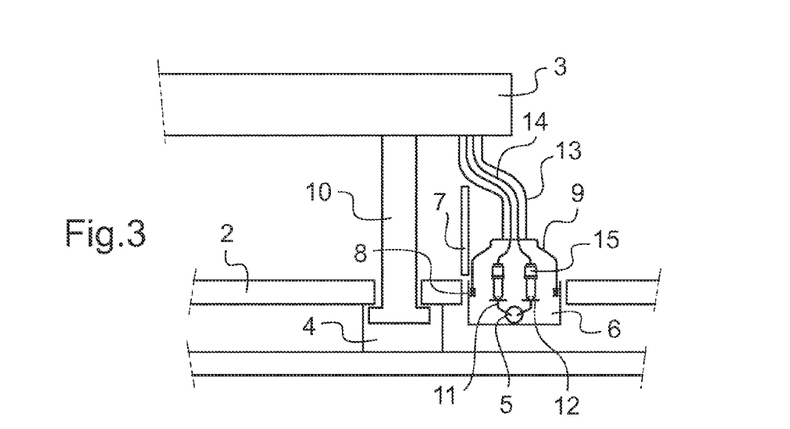
FIG. 3 is a section view of the connection between the socket and the plug.

FIG. 3 shows a piece of equipment 3 fastened in the rail 4 together with the socket 6 connected to a plug 9. The plug 9 has the same number of pins 15 as the socket 6 has contacts 12 and it is connected to a bundle 13 including at least one conductor 14. Each conductor 14 is connected electrically firstly to at least one pin 15 and secondly to electrical appliances of the equipment 3 (not shown in the figures), such as an airbag, or heater means. The bundle 13 runs along and inside the equipment 3.

There can also be seen the movable protection cap 7 in a raised position, i.e. the socket 6 is open, thereby enabling the plug 9 to be connected to the socket 6. When the plug 9 is connected to the socket 6, each contact 12 of the socket 6 has an electrical connection with a pin 15 of the plug 9, thereby electrically connecting the information and power sources of the vehicle with the electrical functions of the equipment 3.

A gasket 8, visible in FIGS. 2 and 3, is interposed between the socket 6 and the movable protection cap 7. Since the gasket 8 is secured to the socket 6, when it is in its closed position the movable protection cap 7 comes into contact against the gasket 8, thereby providing sealing so as to protect the inside of the socket 6, and in particular the contacts 12, from the outside environment.

The outside environment may be aggressive (sand, sea water, mud, . . . ), in particular for electrical components, as can the various loads that are transported or their contents. The socket and the electrical contacts it contains are positioned in the floor and consequently they are very exposed to the outside environment.

As a result, there is a great risk of the socket or the electrical contacts it contains being damaged unless the socket is sufficiently protected to enable it to withstand those elements, i.e. unless the socket is provided with a satisfactory sealing system.

Furthermore, since the movable protection cap 7 is secured to the socket 6 and movable about a hinge pin 20 that is likewise secured to the socket 6, the position of the movable protection cap 7 relative to the gasket 8 is totally independent of deformations of the floor, of various elements of the floor, and of dispersions in socket positioning, in particular dispersions relative to the floor. Consequently, sealing is ensured effectively regardless of such deformations and dispersions.

In order to guarantee this sealing, the movable protection cap 7 needs to be kept in contact with the gasket 8. To do this, it is locked in this position by at least one finger 16 that includes at least one locking means 30.

In the example of FIG. 3, where the equipment 3 is fastened to the floor 2 and the contacts 15 of the plug 9 are connected to the contacts 12 of the socket 6, the plug 9 is in turn in contact with the gasket 8 and provides sealing from the outside environment, there being a locking system (not shown) for locking the plug 9 to the socket 6 so as to enable the plug 9 to remain in contact with the gasket 8.

In a variant, the gasket 8 may be secured to the movable protection cap 7, with another gasket being incorporated in the plug 9, likewise for the purpose of sealing the device when the movable protection cap 7 is open and the plug 9 is connected to the socket 6.

Figure 4:
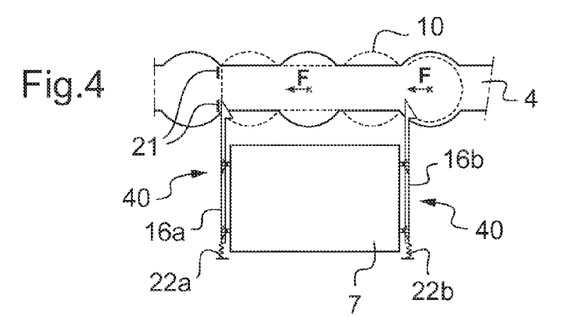
FIGS. 4 and 5 show a first embodiment of the invention.
Figure 5:
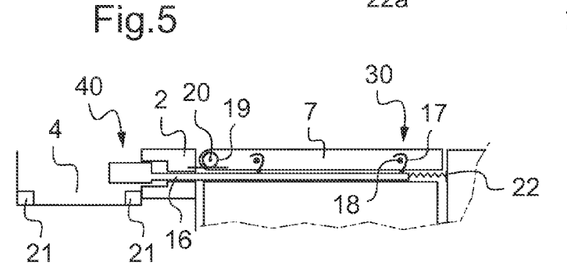

In a preferred embodiment as shown in FIGS. 4 and 5, two opening means 40 comprise two fingers 16a and 16b positioned on either side of the socket 6 and capable of moving in translation perpendicularly to the direction of the rail 4, and also locking means 30 constituted by two hooks 17 on respective ones of the fingers 16 and two pegs 18 secured to the movable protection cap 7. In an initial position, a slope situated at a first end of each finger 16 penetrates into the rail 4 such that when the equipment 3 is mounted in the rail 4, the stand 10 of the equipment 3 co-operates with the slope of each finger 16 on moving in translation along arrow F as far as the positioning abutment 21, thereby causing each finger 16 to move in translation away from the rail 4. The two hooks 17 on the respective fingers 16 then release two pegs 18 secured to the movable protection cap 7, thereby unlocking the movable protection cap 7. The movable protection cap 7 is then caused to turn about the hinge pin 20 parallel to the direction of the rail 4, under drive from at least one torsion spring 19 so as to open the socket 6. This hinge pin 20 may be incorporated in the socket 6 as shown in FIGS. 4 and 5, or it may be incorporated in the cap, or indeed it may be an independent part. A compression spring 22 is placed at the second end of each finger 16 remote from the rail 4 so as to ensure that each finger 16 returns to its initial position when the equipment 3 is moved away from the abutment 21 in order to be withdrawn from the rail 4. Each hook 17 is then moved in translation into a position suitable for locking the protection cap 7. It is then necessary to act manually on the movable protection cap 7 in order to reclose it, each peg 18 then being placed in the corresponding hook 17 so as to lock the movable protection cap 7 on the socket 6.

This redundancy of fingers 16a and 16b serves to avoid accidental or unintended opening of the movable protection cap 7 as a result of human action or of articles being inserted into the rail, and thus avoids the risks associated with such opening.

Because two fingers 16a and 16b are used, it is necessary to have a specific interface in order to cause the movable protection cap 7 to open by moving both fingers 16a and 16b in translation simultaneously, whether this is done during maintenance operations by using a special tool or while mounting equipment 3 having this interface incorporated in the stand 10 of the equipment 3.

Figure 7:
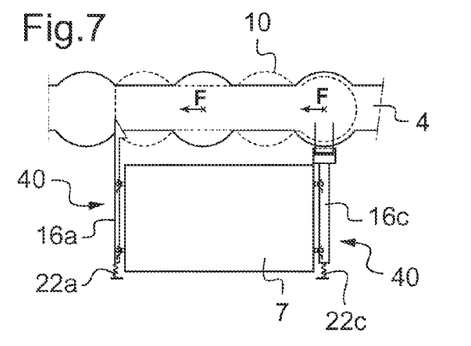
FIGS. 7 and 8 show a third embodiment of the invention.
Figure 8:
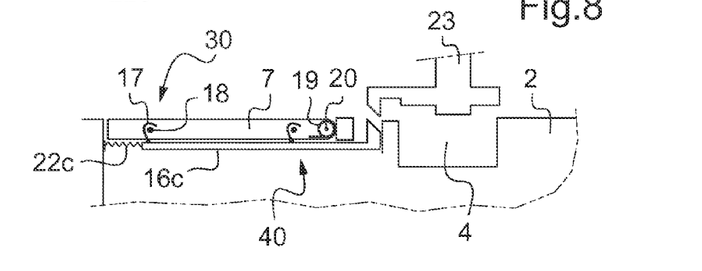

Another embodiment is shown in FIGS. 7 and 8. It uses two fingers 16a and 16c and operates on essentially the same principle as that described with reference to FIGS. 4 and 5. The only difference lies in the way movement in translation of the finger 16c is controlled, which finger replaces the finger 16b of FIGS. 4 and 5. The finger 16c is driven in translation by locking the equipment 3 and not by the stand 10 of the equipment 3 engaging the positioning abutment 21.

FIG. 8 shows the locking system 23 incorporated in the stand 10 of the equipment 3, which system moves in translation to block the equipment 3 in the rail 4 and can bear simultaneously against the slope present at the first end of the finger 16c in order to transmit movement in translation to the finger 16c in a direction perpendicular to the direction of the rail 4.

When the locking system 23 of the equipment 3 is unlocked from the rail 4, the finger 16c is returned in position by means of a compression spring 22c placed at a second end of the finger 16c.

Finally, it is necessary to act manually on the movable protection cap 7, as in the embodiment described with reference to FIGS. 4 and 5, in order to close it onto the socket 6.

The difference between this embodiment and the embodiment described with reference to FIGS. 4 and 5 lies in the opening of the socket being synchronized with the equipment being locked onto the rail and not merely with the equipment reaching the positioning abutment 21.

Figure 6:
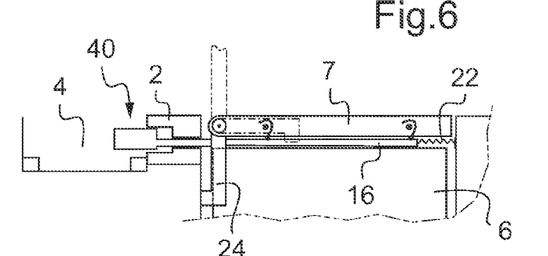
FIG. 6 shows a second embodiment of the invention.

In a variant of the invention shown in FIG. 6, the two fingers 16a and 16b, on moving in translation from an initial position on the same principle as that described with reference to FIGS. 4 and 5 during mounting of the equipment 3 in the rail 4, co-operate with at least one cam 24 that is secured to the movable protection cap 7. The movable protection cap 7 is then caused to turn about a hinge pin 20 parallel to the rail 4 so as to open the socket 6. When the equipment 3 is removed, a compression spring 22 enables each finger 16 to move in translation so as to return in its initial position, thereby acting via the cam 24 of the movable protection cap 7 to drive the movable protection cap 7 in turning in the opposite direction, about the hinge pin 20, so as to close the socket 6.

This alternative presents the additional advantage of automatically closing the socket 6 on removing the seat 3, which provides not only a saving in time when reconfiguring the cabin, but also eliminates any danger of people forgetting to close the socket 6 and thus the risks mentioned above in the event of the socket being opened accidentally, such as damage to the contacts 12 by external elements or people being electrocuted.

Figure 9:
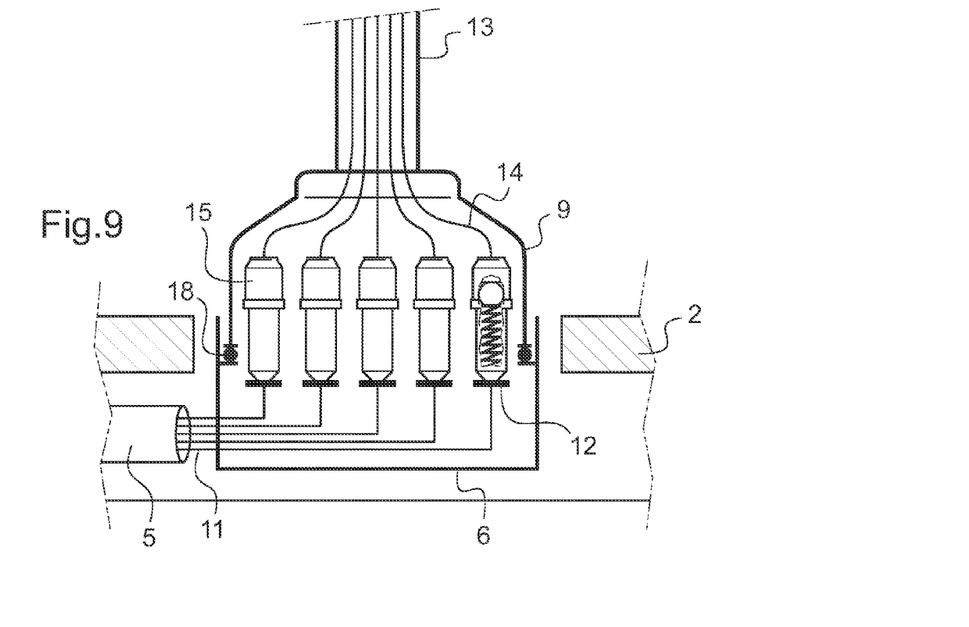
FIG. 9 shows the spring contact system.

In a particular embodiment, shown diagrammatically in FIG. 9, the electrical connections between the plug 9 and the socket 6 make use of spring contacts 15 included in the plug 9 and co-operating with electrical pads 12 included in the socket 6.

The use of contacts having electrical pads 12 in the socket 6 makes it possible, as a result of the small volume of these contacts, to reduce considerably the size of the socket 6, thus enabling it to be completely embedded in floors of small thickness, of the kind that are to be found in particular in rotary wing aircraft, while also making it possible to use a number of contacts that is sufficient for providing all of the electrical functions, such as:

safety functions: airbag (power and trigger signal) . . . ;

comfort functions: heater means, cooling an active suit of a crew member . . . ;

information functions: detecting the presence of passengers, headsets incorporated in the seats, screen, . . . .

Furthermore, the spring contacts 15 included in the plug 9 constitute a technology that is well known and suitable for conveying both signal currents and power supply currents.

Finally, the use of contacts having electrical pads serves to accommodate mechanical differences in the positioning of the movable portion (plug connected to the seat containing the spring contacts) and the stationary portion (socket secured to the floor and containing the electrical pad contacts), such as dispersions in the positioning of slideways or in the mounting of equipment, and also deformation of the floor.

Figure 10:
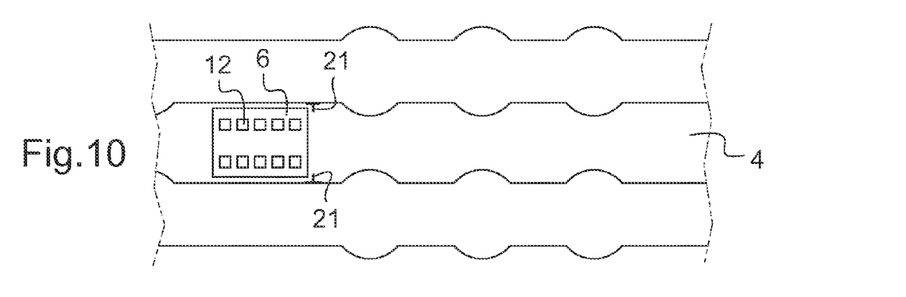
FIGS. 10 and 11 show possible zones for installing the socket.
Figure 11:
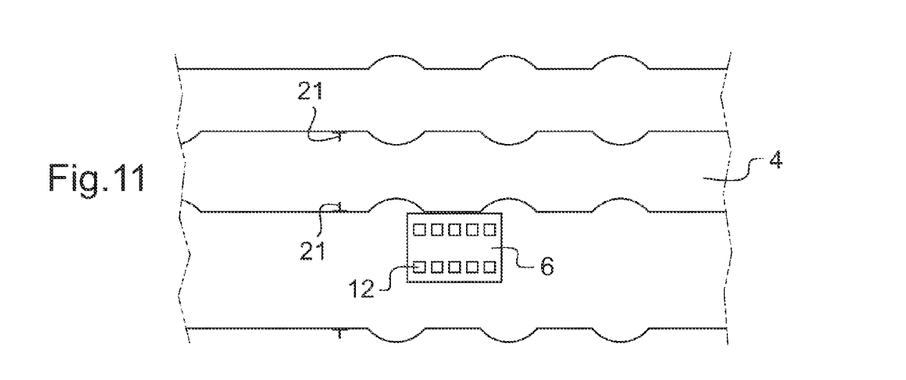

FIG. 10 shows a variant of the invention with the socket 6 installed in continuity with the fastening rail 4. FIG. 11 shows another variant with the socket 6 installed beside the fastening rail 4.

Figure 12:
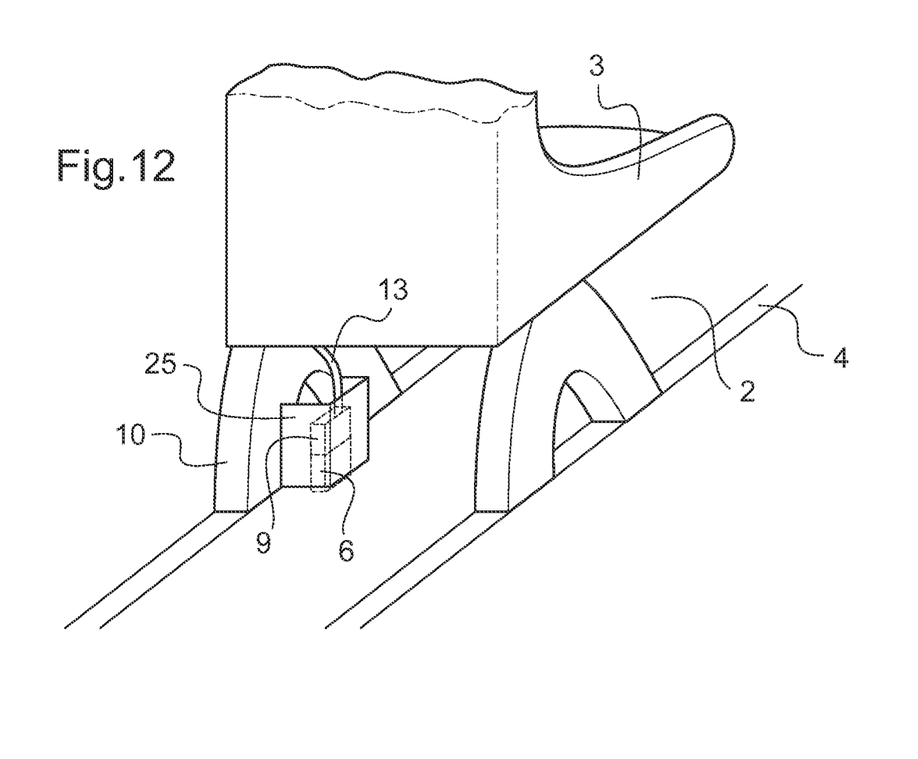
FIG. 12 shows a casing for protecting the plug connected to the socket.

FIG. 12 shows the location of a casing 25 for protecting the plug 9 while connected to the socket 6 from any impacts that might be caused by external elements, in particular the feet of passengers in other seats.

Figure 13:
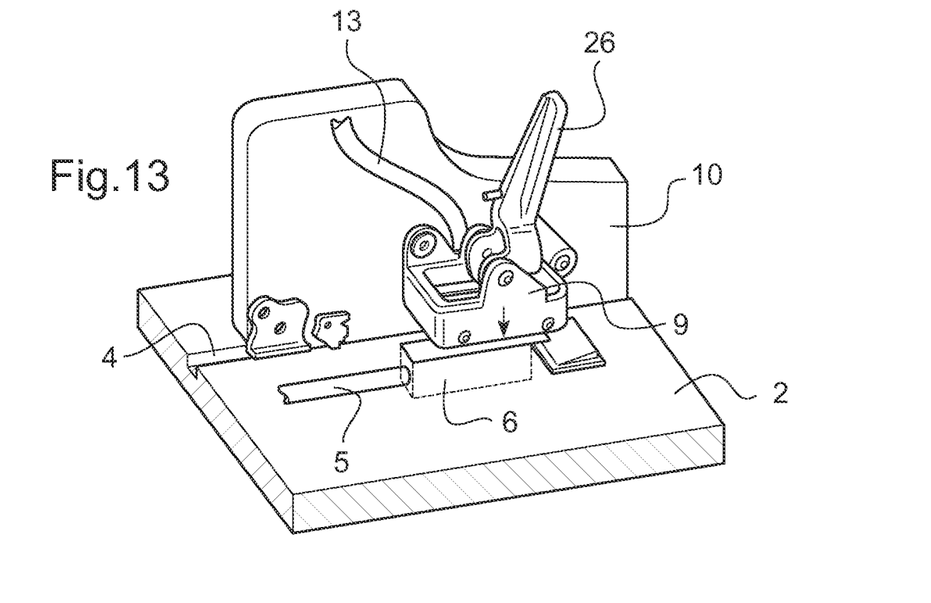
FIG. 13 shows means for connecting the plug to the socket.

FIG. 13 shows an example of a plug 9 that is assembled on the stand 10 of the equipment 3. The plug 9 is movable relative to the stand 10 along a predetermined path, e.g. in vertical translation.

The predetermined path of the plug 9 is defined by the position of the stand 10 facing the floor 2, by the position of the socket 6 in the floor 2, and by the position of the plug 9 relative to the stand 10. The predetermined path enables the plug 9 to be brought into position co-operating with the socket 6 between the contacts 12 of the socket 6 and the pins 15 of the plug 9.

The movement of the plug 9 along the predetermined path may be driven for example by means of a lever 26 connected to the plug 9.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A device for feeding electricity to equipment in a vehicle, the device comprising:
   an electrical harness including at least one electrical conductor; and
   a socket having at least one electrical contact electrically connected to said conductor of said harness, said socket being suitable for co-operating with a plug of said equipment;
   wherein said harness is suitable for extending under the top surface of a floor of said vehicle facing said equipment, said socket being suitable for being embedded in the thickness of said floor so that the top surface of said floor does not present any projecting portion, said device including a movable protection cap for opening and closing said socket, and opening means suitable for being driven by the mounting of said equipment in a rail of said floor to cause said movable protection cap to open.

2. A device according to claim 1, wherein said movable protection cap of said socket, when in its closed position, is flush with the top surface of said floor.

3. A device according to claim 1, wherein said movable protection cap is secured to said socket, a gasket of flexible material being placed between said movable protection cap and said socket in order to ensure that said socket is sealed when closed by said movable protection cap.

4. A device according to claim 1, wherein said opening means comprise two fingers connected to said movable protection cap to allow said movable protection cap to be opened.

5. A device according to claim 4, wherein at least one finger includes an inclined slope placed at a first end of said at least one finger and penetrating, while in a first position, into said rail for co-operating with a stand of said equipment, movement in translation of said stand of said equipment in said rail towards a positioning abutment causing said at least one finger to move in translation, resilient means placed at a second end of said at least one finger ensuring that said at least one finger returns to said first position.

6. A device according to claim 4, wherein at least one finger includes an inclined slope placed at one end of said at least one finger and co-operating, when in a first position, with a locking system of said equipment, the locking of said locking system on said rail causing said at least one finger to move in translation, resilient means placed at a second end of said at least one finger ensuring that said at least one finger returns to said first position.

7. A device according to claim 4, wherein said at least one finger includes at least one locking means for locking said movable protection cap and serving, during movement in translation of said at least one finger, to unlock said movable protection cap while being driven in rotation about a hinge pin by at least one resilient element in order to open said socket.

8. A device according to claim 7, wherein said locking means include at least one hook and at least one peg respectively secured to said socket or to said movable protection cap.

9. A device according to claim 4, wherein said movable protection cap includes at least one cam co-operating with said at least one finger, the movement in translation of said at least one finger causing said movable protection cap to turn.

10. A device according to claim 1, wherein said socket includes at least one electrical pad contact suitable for being connected to a plug having at least one electrical pin connected to said equipment in order to provide the electrical connection between said harness and said equipment, each electrical pin of said plug comprising a spring contact suitable for co-operating with an electrical pad contact of said socket.

11. A device according to claim 1, including protection means for protecting said plug connected to said socket against impacts possibly caused by external elements.

12. An aircraft comprising:
  at least one piece of equipment having a plug that contains at least one electrical pin, said plug being connected to said at least one piece of equipment via an electrical bundle;
  a floor including at least one fastener rail for fastening said at least one piece of equipment; and
  a device for feeding electricity to said at least one piece of equipment, the device including a harness having at least one electrical conductor, a socket having at least one electrical contact electrically connected to said conductor(s) of said harness, said socket co-operating with said plug to provide electrical connection between said harness and said equipment;
  wherein said device is a device according to claim 1, said harness running under the top surface of said floor facing said equipment, said socket being embedded in the thickness of said floor, the top surface of said floor thus presenting no projecting portion, opening means driven by mounting said at least one piece of equipment in said at least one rail of said floor causing said socket to open and close by means of a movable protection cap.

13. An aircraft according to claim 12, wherein said movable protection cap of said socket, when in its closed position, is flush with the top surface of said floor.

14. An aircraft according to claim 12, including protection means for protecting the plug connected to said socket against impacts that might be caused by external elements, said at least one piece of equipment being fastened to said floor.

15. An aircraft according to claim 12, wherein said plug of said at least one piece of equipment is connected to said stand of said at least one piece of equipment in such a manner that, once said at least one piece of equipment is locked in said at least one rail, said plug moves along a predetermined path under drive from a lever so as to connect with said socket.

* * * * *